United States Patent [19]

Daniel

[11] Patent Number: 5,772,367
[45] Date of Patent: Jun. 30, 1998

[54] SUCTION/BLOWER ATTACHMENT FOR POWER TOOLS

[76] Inventor: Elie C. Daniel, P.O. Box 147, Mendota, Ill. 61342

[21] Appl. No.: 658,028

[22] Filed: Jun. 4, 1996

[51] Int. Cl.⁶ ...................................................... B23B 47/34
[52] U.S. Cl. ................................ 408/67; 173/75; 408/56; 408/58
[58] Field of Search .................................. 408/67, 241 R, 408/207, 56, 58, 72 R, 200; 409/137; 173/75

[56] References Cited

U.S. PATENT DOCUMENTS

| | | | |
|---|---|---|---|
| 2,437,668 | 3/1948 | Adams | 408/67 |
| 3,850,254 | 11/1974 | Hirdes | 408/58 |
| 3,881,838 | 5/1975 | Derbyshire | 408/67 |
| 3,936,213 | 2/1976 | Kappel | 408/67 |
| 4,921,375 | 5/1990 | Famulari | 408/67 |

FOREIGN PATENT DOCUMENTS 2441455  7/1980  France ...................................... 408/67

*Primary Examiner*—Steven C. Bishop
*Attorney, Agent, or Firm*—Rockey, Milnamow & Katz

[57] ABSTRACT

An attachment for a rotating tool bit provides air flow in the vicinity of the work area without the need for separate vacuum or compressed air supplies. The device is mounted on the shaft of the rotating tool bit and provided with a plurality of vanes which direct airflow through a cylindrical housing towards or away from the work area. A central aperture provides resilient mounting of the attachment to the tool bit. The attachment is capable of providing suction as well as forced-air to the work area. A number of embodiments are disclosed for directing the exhausted air in different directions, depending on the application of the tool and operator orientation. A filter may be incorporated into the attachment in order to collect dust and debris carried away from the work area by the air flow.

12 Claims, 5 Drawing Sheets

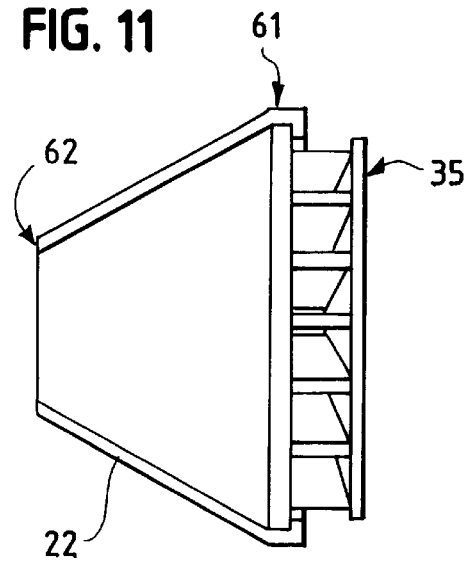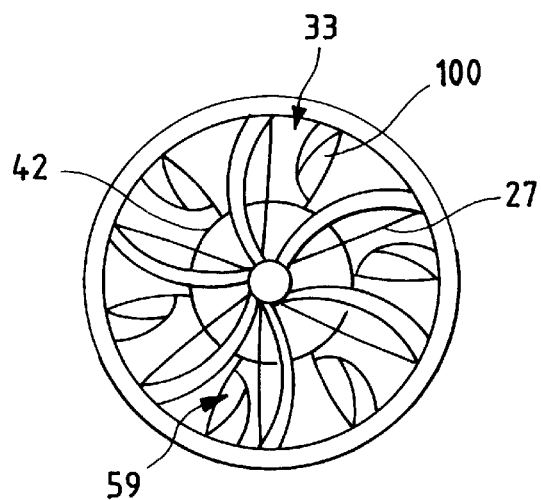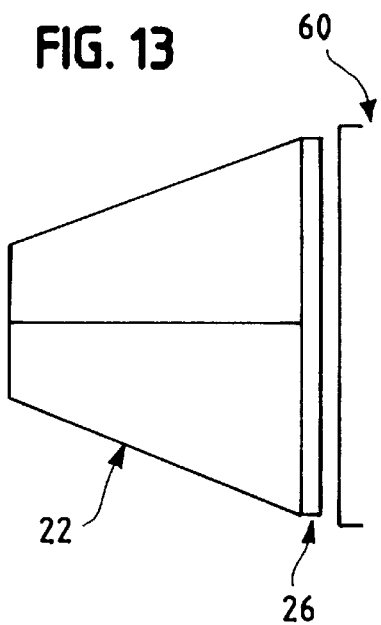

SUCTION/BLOWER ATTACHMENT FOR POWER TOOLS

BACKGROUND

This invention relates generally to attachments for rotating power tools including drills. More specifically, the invention relates to a suction or blower unit which utilizes the rotational motion of a tool bit to provide a vacuum or forced air to an area being operated on by the tool.

Prior art attempts to provide a compact, integral attachment for providing both suction and forced air to the work area have fallen short of providing a simple and inexpensive device that permits a clear view of the work area. Some prior art devices, such as those disclosed in U.S. Pat. No. 3,583,821 to Shaub et al and U.S. Pat. No. 3,936,213 to Kappel, incorporate a shroud to collect debris that falls or is projected from the work area when drilling occurs. Other devices provide for airflow in the work area using external vacuum or forced air sources. For example, U.S. Pat. Nos. 3,837,383 to Ko, and 5,052,411 to Schoolman, disclose vacuum attachments for removing dust and debris from the work area. Similarly, U.S. Pat. No. 4,184,226 to Loevenich teaches a shroud for use with drilling devices which relies on an external vacuum to carry debris away from the work area. Prior art devices which do not rely on vacuum or forced air to remove debris are somewhat ineffective at maintaining a clean work space. Moreover, such devices hide the work area from the view of the operator and therefore affect the accuracy of the tool operation. Those prior art devices that require a separate vacuum source apart from the tool are relatively complex and expensive. Reliance on an external vacuum source also restricts the transportability of the tool.

There is thus a need for an attachment for power tools which provides airflow to the work space without separate vacuum or compresses air or electric power sources. There is also a need for a power tool attachment which is relatively inexpensive to manufacture and which may be adapted to existing power tool structures.

SUMMARY OF THE INVENTION

The present invention solves the aforementioned problems by providing an attachment for rotary tools, such as power drills, which incorporates a turbine that is rotated under the tool power to generate an airstream in the vicinity of the work space. In a preferred embodiment, the attachment is constructed as a generally conical housing member which is provided with internal vanes that operate to create an airflow towards or away from the work area. A filter may be incorporated into the housing in order to collect debris that is removed. The present invention eliminates the need for external vacuum or compressed air sources because it operates using energy provided by the rotating parts of the power tool. The attachment may be configured to provide either a vacuum or forced air to, or away from, the work area. The attachment is readily adaptable to different size tool bits because a resilient mounting aperture is provided on its housing.

DESCRIPTION OF THE DRAWINGS

FIG. 11 illustrates a snap-fitting arrangement utilized in accordance with a preferred embodiment of the invention.

FIGS. 12 and 13 illustrate a fifth preferred embodiment of the invention.

DESCRIPTION OF THE PREFERRED EMBODIMENTS

Figure 1:
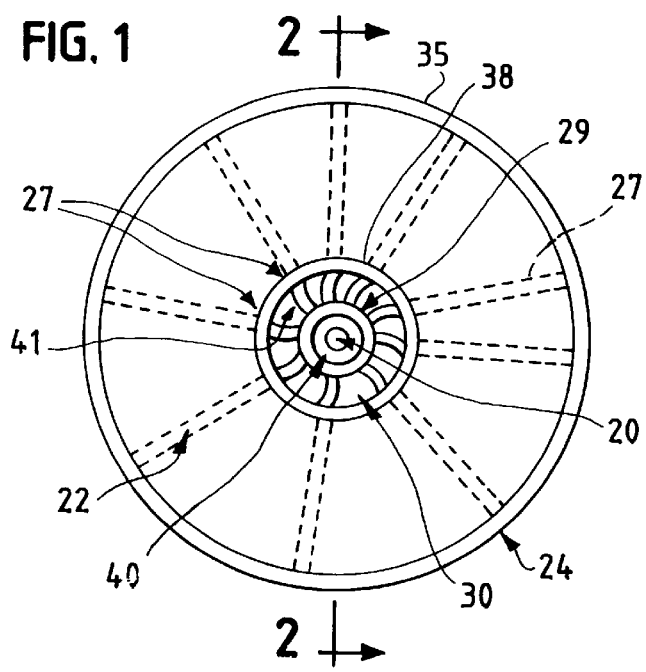
FIGS. 1–3 illustrate a preferred embodiment of the invention with FIG. 2 being a cross-section of FIG. 1 along line 2—2.
Figure 2:
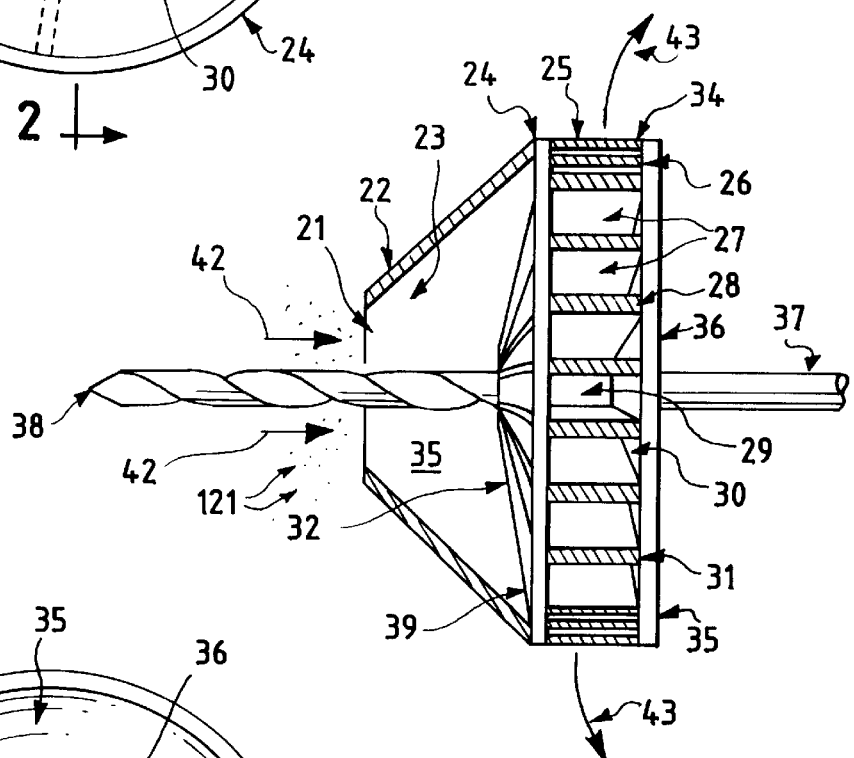
Figure 3:
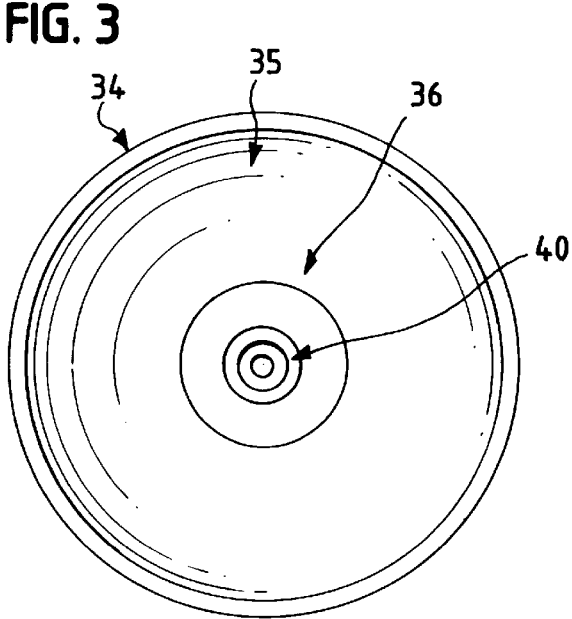

Referring to FIGS. 1–3, a preferred embodiment of the invention comprises a generally conical casing 22 attached to a base assembly 35 which is provided with a number of impellers 27 extending radially from central tube 29. Central tube 29 is provided with an axial hole 20 which frictionally engages drill bit 37 to retain the suction blower attachment thereon. Central tube 29 may be provided with a resilient elastomeric material, such as rubber to provide frictional engagement with the outer surface of drill bits of different diameters. Casing 22 defines an interior chamber 33 and a circular tip opening 21 which directs air flow towards or away from the work area operated on by drill bit tip 38.

Base assembly 35 includes a base plate 36 which is provided as a concave surface (when viewed from the direction shown in FIG. 3) to permit the suction blower attachment to operate in close proximity to the drill chuck (not shown) without interference therefrom. Impellers 27 extend from central tube 29 radially and are disposed adjacent base plate 36 to define channels 32 between adjacent impellers. Channels 32 communicate with the interior chamber 33 of casing 22. Impellers 27 are illustrated as generally planar and extending radially, however, it is to be understood that impellers 27 may be shaped in a convex or concave manner, or any combination thereof, or on an angle to the base, and or the central tube, rather than extending exactly along a radial line from central tube 29 in order to provide the desired air flow rate and direction as the attachment rotates with the drill bit 37. A ring-shaped junction plate 24 is provided adjacent the impellers 27 on their sides opposite the base plate 36. Junction plate 24 provides a planar surface for attachment of conical casing 22 to base assembly 35. Attachment may be accomplished by any conventional means, such as by adhesive or thermal welding.

Base plate 36 and junction plate 24 are provided with a diameter which is slightly greater than the diameter defined by the lateral edges 31 of impellers 27. Base plate 36 and junction plate 24 thus define ledges extending past the impellers 27 in order to provide a space for mounting an annular filter element 26, which is preferably a fleece filter, as best shown in FIG. 2. Filter 26 is retained in place using a bracelet retainer 25 (shown in more detail in FIGS. 8 and 9 and further described below). Base assembly 35 and casing 22 may be formed from injection molded plastic, such as polyethylene or polystyrene, with each part being formed as an integral one-piece element and assembled by attaching casing 22 to base assembly 35 at junction plate 24.

In operation, the suction blower attachment is secured to drill bit 37 by inserting drill bit tip 38 into axial hole 20 and sliding the attachment toward the drill chuck to the desired location. Rotational motion of the drill bit 37 turns the entire suction blower attachment. When the attachment is functioning as a suction tool, impellers 27 force air outward away from the center of the attachment through channels 32, filter 26 and apertures 55 in retainer bracelet 25 (FIG. 9) and create air flow into tip opening 20. Particulate matter 121 generated from the drill bit is drawn into tip opening 20 and collected at filter element 26 where it is retained partially by centrifugal force and partially by the structure of the filter element 26.

In accordance with the present invention, the attachment may also function as a blower tool to create an airflow towards the work area operated on by drill bit tip 38. This is accomplished by blocking the apertures 55 in retainer bracelet 53 (FIG. 9) such that air flow from the channels 32 outward in a radial direction is prevented. Blocking of apertures 55 may be accomplished by fastening a solid band around the circumference of bracelet 25. As applicant has discovered quite unexpectedly, rotational motion of the suction blower attachment, when configured to prevent airflow through the retainer bracelet 25, results in a vortex flow pattern whereby air flows centrally into the tip opening 21, circulates towards filter element 26, and exits through tip opening 21 peripherally of the central inflow. Thus, debris is deposited on filter 26.

Figure 4:
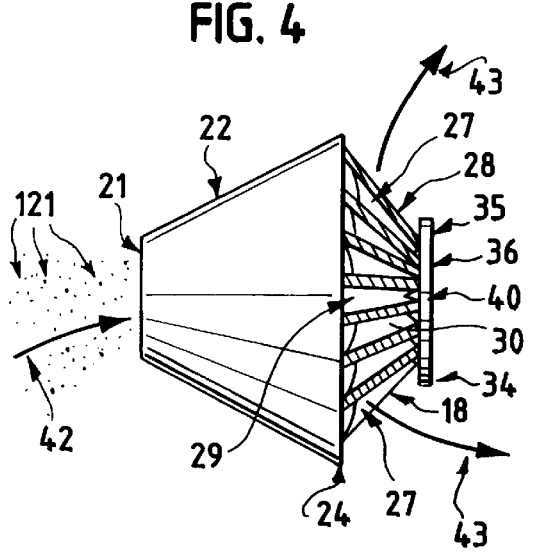
FIG. 4 illustrates a second preferred embodiment of the invention.

FIG. 4 shows another preferred embodiment of the invention in which the base assembly 35 is formed such that impellers 27 define channels 32 which direct air in a longitudinal direction as represented by arrows 43. This configuration provides an efficient aerodynamic path for the air traveling through the suction blower attachment and minimizes the flow resistance within the attachment.

Figure 5:
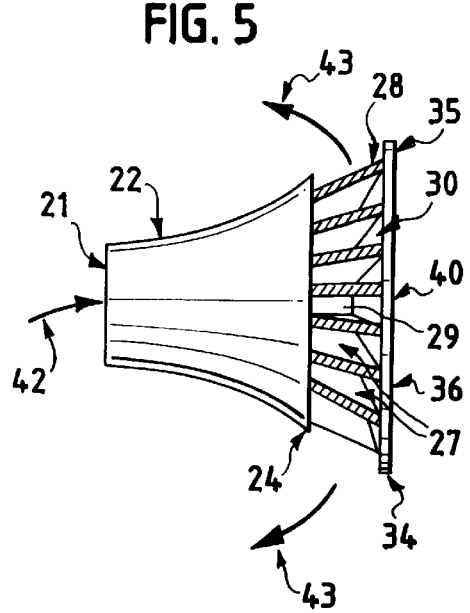
FIG. 5 illustrates a third preferred embodiment of the invention.

FIG. 5 shows another preferred embodiment of the invention in which the casing 22 is formed as a convex part and the base assembly is configured to provide airflow back towards the work area as represented by the arrows 43. This configuration is advantageous when it is desirable to keep the filtered air away from the operator because of odor or toxicity.

Figure 6:
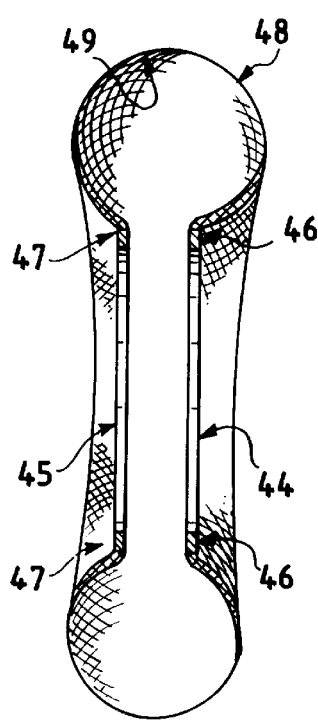
FIGS. 6 and 7 illustrate a filter sack of a preferred embodiment of the invention.
Figure 7:
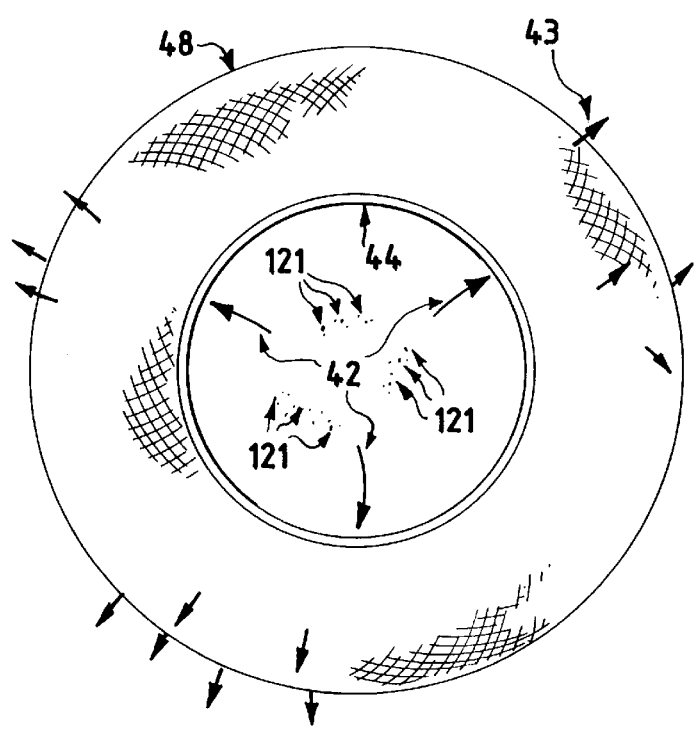

FIGS. 6 and 7 depict a filter sack 48 which may be used in place of the filter ring 26 and bracelet 25 previously described with reference to FIGS. 1–3. Filter sack 48 comprises a filter material formed in a donut shape and provided with a pair of centrally located retaining rings 44 and 45 attached thereto using, for example, adhesive. Retaining rings 44 and 45 are formed of plastic and adapted to frictionally engage the radial edges of impellers 27 (FIGS. 1–3) or alternatively, to engage the perimeter of junction plate 24 and base plate 36, thereby retaining the filter sack on the base assembly 35. When the attachment rotates, air is forced into the interior of the filter sack by impellers 27, thereby inflating the filter sack and trapping contaminants therein as air flows through the filter material.

Figure 8:
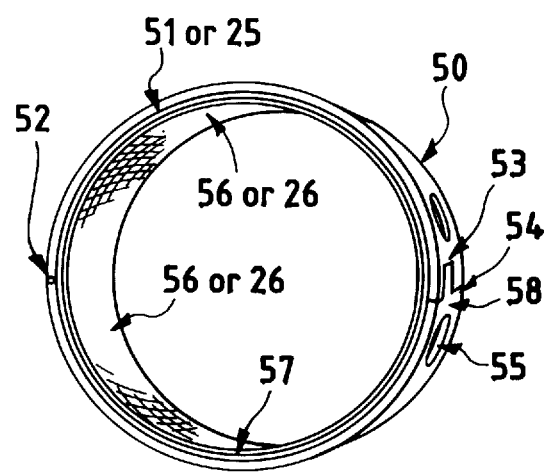
FIGS. 8 and 9 illustrate a bracelet retainer and ring filter according to a preferred embodiment of the invention.
Figure 9:
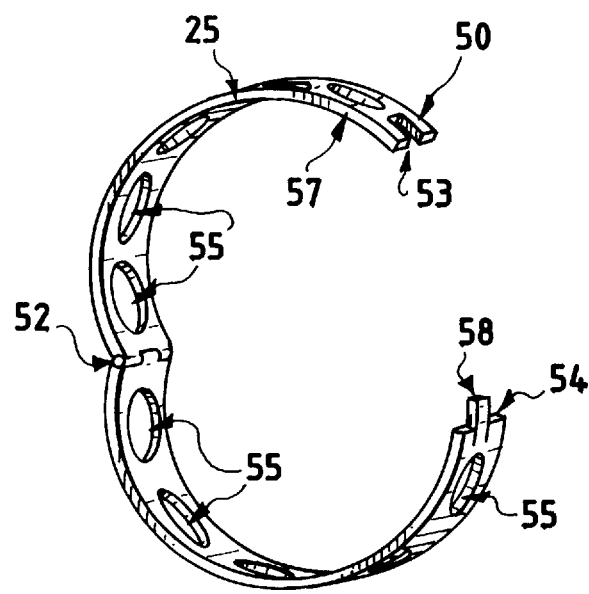

FIGS. 8 and 9 depict in detail the retainer bracelet 25 and ring filter 26. Retainer bracelet 25 is provided as a hinged ring with hinge 52 and coupling 54. Coupling 54 is provided as a male member 58 which may be snappingly retained in a female member 53 using projections and recesses (not shown) in a known manner. Bracelet 25 may thus be installed and removed by unsnapping the male and female members and pivoting the two semi-circular halves about pivot 52. Filter 26 is provided as a ring shaped element which is sized to fit within the inner diameter of the bracelet retainer 25.

Figure 10:
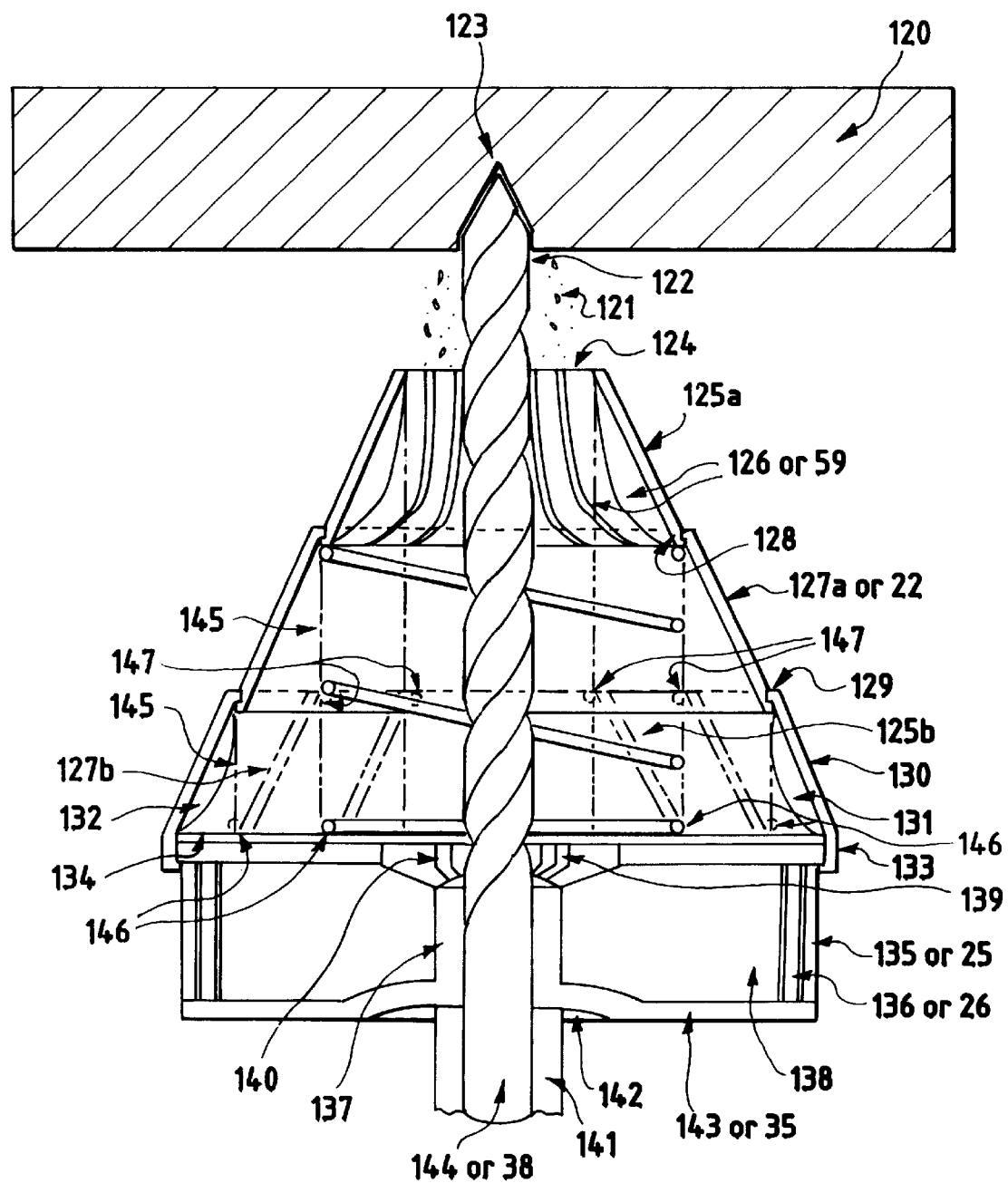
FIG. 10 illustrates a fourth preferred embodiment of the invention.

FIG. 10 illustrates another preferred embodiment of the invention which is provided with a retractable casing to permit location of the tip opening 21 near the work area as the drill bit 37 moves into the work piece 120. Telescoping segments 125 and 22 are mounted movably with respect to base segment 130 such that segments 125 and 22 move between the positions shown in solid lines and those shown in dotted lines in FIG. 10. Retainer knobs 146 and 147 are provided at the extremities of each segment to limit travel with respect to each other. A coil spring 126 may be disposed in abutting relationship to the knobs 128 and base segment to bias the segments towards the extended position. Tip segment 125a is provided with impellers 124 which convey air away from tip opening towards casing 22. Base segment is provided with impellers 131 therein for directing air towards the base assembly 35. Base assembly is provided with a filter 26 and retainer bracelet 25 as described above with reference to FIGS. 1–3. Base assembly 35 is affixed to the drill bit 38 by central tube 137 which resiliently and frictionally engages the outside surface of drill bit 38. Base segment 130 is provided with a snap fitting 133 as described above with reference to FIG. 11 for releasably retaining the telescoping casing assembly to the base assembly 35. In operation, the telescoping casing retracts as the tip of the casing abuts the work piece and the drill bit proceeds through the work piece. Contaminant particles are contained within the casing and drawn towards the filter element 26 by the air flow within the casing.

FIG. 11 depicts another preferred embodiment of the invention in which the casing 22 is provided with a snap fitting 61 for attachment to the ledge of the base assembly 35 to permit easy assembly and disassembly. Snap fitting 61 is formed as a lip on the perimeter of casing 22. Base assembly junction plate 24 may be formed with a chamfered surface to permit easy deformation of the lip as the casing is fitted on to the base assembly 35. Snap fitting 61 may be formed so as to fix casing 22 to base assembly 35 or, alternatively, to permit rotation of base assembly 35 while casing 22 remains stationary, for example, if casing were to frictionally engage the work area.

FIGS. 12 and 13 show another preferred embodiment of the invention which incorporates the base assembly as an integral part of the casing 22. Also provided are minor impeller elements 100 formed on the inside of casing 22 to improve the air flow capabilities of the attachment. This configuration provides for axial air flow. A filter sack 60, as described above with reference to FIGS. 6 and 7 is provided in conjunction with the casing 22. In this embodiment, filter sack 60 is provided with retainer rings 44 and 45 sized to seal against casing 22. That is, ring 45 is provided with an inside diameter that fits over the outside of casing 22 and ring 44 is provided with an inside diameter such that ring 44 seals against the face 42 (FIG. 12) of casing 22. Filter sack 60 will then rotate with the casing 22. Alternatively, one retainer ring may be fixed with respect to the drill body (not shown) whereby the filter sack 60 remains stationary with respect to the rotating casing 22.

The preceding description is intended to illustrate preferred embodiments of the invention and should not be construed as limiting the scope of the invention. Various other embodiments and modifications are possible without departing from the scope of the invention as set forth in the appended claims.

What is claimed is:

1. An attachment for a rotary power tool having an elongate rotating tool bit for operating on a work area, said attachment comprising:

a) a casing defining an interior cavity and including an airflow opening communicating with the interior cavity for permitting air flow into and out of the interior space;

b) a base assembly attached to the casing and including:

(i) means for mounting the base assembly on the tool bit for rotary movement therewith;

(ii) a plurality of impellers for causing air flow within the casing when the attachment rotates;

whereby rotation of the tool bit results in air flow to remove debris from the work area.

2. The attachment of claim 1, wherein the casing is conical in shape, said opening being formed at the apex of the conical shape.

3. The attachment of claim 1, wherein the means for mounting comprises a central mounting tube provided with resilient means for frictionally engaging the periphery of the tool bit.

4. The attachment of claim 1, wherein the casing is comprised of a plurality of telescoping members which enable collapse of the casing in an axial direction as the tool bit is advanced into the work area.

5. The attachment of claim 4, wherein said telescoping members are biased with springs against collapse of the casing.

6. The attachment of claim 1, wherein the attachment is constructed of translucent material to allow for observation of the work area.

7. The attachment of claim 1, further comprising a filter disposed on the base assembly.

8. The attachment of claim 1, further comprising a filter disposed about the periphery of the casing and in communication with the channels.

9. The attachment of claim 8, further comprising retainer means for retaining the filter on the periphery of the casing.

10. The attachment of claim 9, wherein the retainer means comprises a bracelet element adapted to secure the filter to the casing.

11. The attachment of claim 1, wherein the casing is releasably mounted on the base assembly.

12. The attachment of claim 1, wherein the impellers direct air in an axial direction with respect to the tool bit as the attachment rotates.

* * * * *